United States Patent
Hayashida

(10) Patent No.: US 9,855,765 B2
(45) Date of Patent: Jan. 2, 2018

(54) INK-JET RECORDING METHOD AND INK-JET RECORDING APPARATUS

(71) Applicant: Brother Kogyo Kabushiki Kaisha, Nagoya-shi, Aichi-ken (JP)

(72) Inventor: Kenta Hayashida, Inazawa (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/268,721

(22) Filed: Sep. 19, 2016

(65) Prior Publication Data
US 2017/0182790 A1    Jun. 29, 2017

(30) Foreign Application Priority Data

Dec. 25, 2015   (JP) ................................ 2015-254141

(51) Int. Cl.
| | |
|---|---|
| *B41J 2/21* | (2006.01) |
| *H04N 1/60* | (2006.01) |
| *H04N 1/56* | (2006.01) |
| *H04N 1/58* | (2006.01) |
| *G03G 15/01* | (2006.01) |

(52) U.S. Cl.
CPC .......... *B41J 2/2132* (2013.01); *B41J 2/2135* (2013.01); *H04N 1/56* (2013.01); *H04N 1/58* (2013.01); *H04N 1/60* (2013.01); *H04N 1/6002* (2013.01); *H04N 1/6005* (2013.01); *G03G 15/01* (2013.01); *H04N 1/6069* (2013.01)

(58) Field of Classification Search
CPC ......... B41J 2/2132; B41J 2/2135; H04N 1/58; H04N 1/56; H04N 1/60; H04N 1/6002; H04N 1/6005; H04N 1/6069; G03G 15/01
See application file for complete search history.

(56) References Cited

U.S. PATENT DOCUMENTS

| | | | |
|---|---|---|---|
| 5,428,377 A | * | 6/1995 | Stoffel .................. B41J 2/2107 347/15 |
| 5,609,671 A | | 3/1997 | Nagasawa |

(Continued)

FOREIGN PATENT DOCUMENTS

| | | |
|---|---|---|
| JP | H06-113155 A | 4/1994 |
| JP | H07-285264 A | 10/1995 |
| JP | H08-003498 A | 1/1996 |

(Continued)

*Primary Examiner* — Henok Legesse
(74) *Attorney, Agent, or Firm* — Banner & Witcoff, Ltd.

(57) ABSTRACT

There is provided an ink-jet recording method including: formation of an achromatic color recording area in a recording medium by using an achromatic color-ink; formation of a chromatic color recording area in the recording medium by using at least one chromatic color-ink; and formation of a boundary area including a first achromatic color boundary area formed by the achromatic color-ink and the chromatic color-inks, and a second achromatic color boundary area formed by the chromatic color-inks, wherein the first achromatic color boundary area is located to be adjacent to the achromatic color recording area, and the second achromatic color boundary area is located to be adjacent to the chromatic color recording area; and the boundary area is formed to have a width of not more than 340 μm, and the second achromatic color boundary area is formed to have a width of not more than 170 μm.

18 Claims, 7 Drawing Sheets

(56) References Cited

U.S. PATENT DOCUMENTS

| | | | |
|---|---|---|---|
| 5,692,843 A * | 12/1997 | Furuya | B41J 2/2132 347/43 |
| 5,837,045 A | 11/1998 | Johnson et al. | |
| 6,682,169 B2 * | 1/2004 | Otsuki | B41J 2/2132 347/41 |
| 7,819,962 B2 | 10/2010 | Gu | |
| 7,922,805 B2 | 4/2011 | Kowalski et al. | |
| 8,016,404 B2 * | 9/2011 | Kato | C09D 11/328 347/100 |
| 8,616,666 B2 * | 12/2013 | Truong | B41M 3/00 347/40 |
| 8,858,695 B2 | 10/2014 | Gu et al. | |
| 2006/0201380 A1 | 9/2006 | Kowalski et al. | |
| 2007/0100023 A1 | 5/2007 | Burns et al. | |
| 2007/0100024 A1 | 5/2007 | Gu et al. | |
| 2008/0241398 A1 | 10/2008 | Kato et al. | |
| 2009/0229489 A1 | 9/2009 | Gu | |
| 2016/0075880 A1 | 3/2016 | Gu et al. | |

FOREIGN PATENT DOCUMENTS

| | | |
|---|---|---|
| JP | H08-216389 A | 8/1996 |
| JP | H10-086503 A | 4/1998 |
| JP | 2000-513396 A | 10/2000 |
| JP | 2002-079695 A | 3/2002 |
| JP | 2003-220717 A | 8/2003 |
| JP | 2008-000959 A | 1/2008 |
| JP | 2008-524400 A | 7/2008 |
| JP | 2008-246821 A | 10/2008 |
| JP | 2009-515007 A | 4/2009 |
| JP | 2011-515535 A | 5/2011 |
| JP | 2014-205325 A | 10/2014 |

* cited by examiner

INK-JET RECORDING METHOD AND INK-JET RECORDING APPARATUS

CROSS REFERENCE TO RELATED APPLICATION

The present application claims priority from Japanese Patent Application No. 2015-254141 filed on Dec. 25, 2015, the disclosure of which is incorporated herein by reference in its entirety.

FIELD OF THE INVENTION

The present invention relates to an ink-jet recording method and an ink-jet recording apparatus.

DESCRIPTION OF THE RELATED ART

In a case that an ink-jet recording of a color image is performed on a recording medium with inks, a phenomenon so-called bleeding, in which an ink is blurred, occurs in some cases at the boundary portion between an achromatic color recording area and a chromatic color recording area of the color image. If the bleeding occurs as described above, the recording quality of the color image is deteriorated. As the techniques for suppressing the bleeding, there are known, for example: a technique of using a reactive color ink for the boundary portion; a technique for applying a liquid for improving printing performance (printing performance enhancing liquid) to the boundary portion; and a technique of forming, at the boundary portion, a thinning out area in which no recording is performed.

However, the techniques described above involve the following problems. Firstly, in the technique which uses the reactive color ink and in the technique which uses the printing performance enhancing liquid, it is necessary to prepare the reactive color ink and the printing performance enhancing liquid separately from the inks used for the recording. Therefore, it is necessary to provide, also on the ink-jet recording apparatus, any mechanism for the reactive ink or the printing performance enhancing liquid as described above, resulting in the increase in the cost. Further, in the technique in which the thinning out area is formed at the boundary portion, the color of the thinning out area is limited to the color of the recording medium (usually white), thus causing problem in view of the printing quality.

In view of the above, an object of the present teaching is to provide an ink-jet recording method and an ink-jet recording apparatus of which cost is low, in which the recording quality of a recorded matter is excellent, and which is capable of effectively preventing the bleeding in the boundary portion between the achromatic color recording area and the chromatic color recording area.

SUMMARY

According to a first aspect of the present teaching, there is provided an ink-jet recording method for performing recording by discharging an ink from an ink-jet head onto a recording medium, the ink constructing an ink set for ink-jet recording which includes an achromatic color ink and at least three chromatic color inks, the method including:
formation of an achromatic color recording area in the recording medium by using the achromatic color ink;
formation of a chromatic color recording area in the recording medium by using at least one chromatic color ink selected from the at least three chromatic color inks; and formation of a boundary area in the recording medium, the boundary area including a first achromatic color boundary area formed by the achromatic color ink and the at least three chromatic color inks, and a second achromatic color boundary area formed by the at least three chromatic color inks,
wherein the first achromatic color boundary area is located such that the first achromatic color boundary area is adjacent to the achromatic color recording area, and the second achromatic color boundary area is located such that the second achromatic color boundary area is adjacent to the chromatic color recording area; and
the boundary area is formed to have a width, in a direction from the achromatic color recording area toward the chromatic color recording area, of not more than 340 µm, and the second achromatic color boundary area is formed to have a width in the direction of not more than 170 µm.

According to a second aspect of the present teaching, there is provided an ink-jet recording apparatus which performs recording by discharging an ink toward a recording medium, the apparatus including:
an ink accommodating section configured to be accommodatable an ink set for ink-jet recording which includes an achromatic color ink and at least three chromatic color inks;
an ink jet head; and
a controller configured to control the ink-jet head to perform:
formation of an achromatic color recording area in the recording medium by using the achromatic color ink,
formation of a chromatic color recording area in the recording medium by using at least one chromatic color ink selected from the at least three chromatic color inks, and
formation of a boundary area in the recording medium, the boundary area including a first achromatic color boundary area formed by the achromatic color ink and the at least three chromatic color inks, and a second achromatic color boundary area formed by the at least three chromatic color inks;
the controller controlling the ink-jet head such that the first achromatic color boundary area is located adjacent to the achromatic color recording area and the second achromatic color boundary area is located adjacent to the chromatic color recording area; and that the boundary area is formed to have a width, in a direction from the achromatic color recording area toward the chromatic color recording area, of not more than 340 µm, and the second achromatic color boundary area is formed to have a width in the direction of not more than 170 µm.

In the present teaching, the inks for recording are used to form the first and second achromatic color boundary areas in the boundary area which is located between the achromatic color recording area and the chromatic color recording area. Accordingly, in the present teaching, since any special treating liquid different from the inks for recording is not used and any special mechanism is also not needed, it is possible to lower the cost. Further, in the present teaching, since the boundary area is formed by using the achromatic color, it is possible to increase the recording quality of a recorded matter. Furthermore, in the present teaching, any achromatic color ink is not used to form the second achromatic color boundary area located adjacent to the chromatic color recording area. Therefore, the effect of suppressing the bleeding is high in the present teaching. Moreover, in the present teaching, the boundary area is formed to have the width, in the direction from the achromatic color recording area toward the chromatic color recording area, of not more than 340 μm, and the second achromatic color boundary area is formed to have the width in the above-described direction of not more than 170 μm, each of the widths having an extent unrecognizable to a human eye. Accordingly, the presence of the boundary area is hardly recognizable to the human.

DESCRIPTION OF THE PREFERRED EMBODIMENTS

Figure 1A:
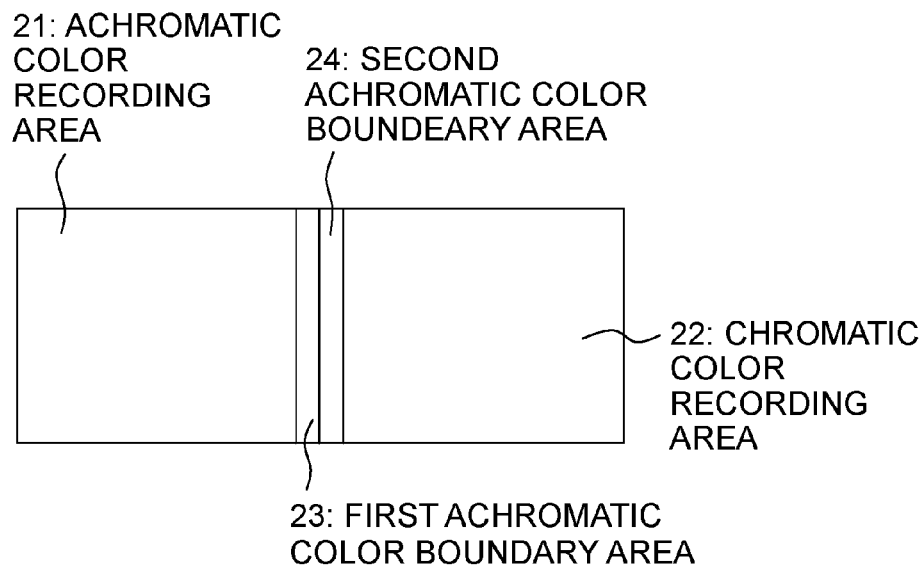
FIG. 1A and FIG. 1B are each a view explaining a first achromatic color boundary area and a second achromatic color boundary area.

In the present teaching, the term "achromatic color" refers, for example, to achromatic color except for the white color, and the term includes the black color and the gray color. Furthermore, the term "chromatic color" means the color other than the achromatic colors of white, black, and gray.

An ink-jet recording method and an ink-jet recording apparatus related to the present teaching will be explained. As described above, the ink-jet recording method and the ink-jet recording apparatus related to the present teaching are configured to perform recording on a recording medium by discharging (jetting) inks, constructing an ink-jet recording ink set including an achromatic color ink and at least three chromatic color inks, onto the recording medium from an ink-jet head. Then, firstly, an explanation will be given about the ink-jet recording ink set (hereinafter referred to as "ink set", in some cases) usable in the ink-jet recording method and the ink-jet recording apparatus related to the present teaching.

<Achromatic Color Ink>

Firstly, the achromatic color ink will be explained. The achromatic color ink contains a colorant of achromatic color, and a solvent. In the following, although the solvent is explained as being water, the solvent of the achromatic color ink is not limited to water. The colorant of the achromatic color is not particularly limited, and may be either an achromatic color pigment or an achromatic color dye.

The achromatic color pigment in not particularly limited, and is exemplified, for example, by carbon black, an inorganic pigment, an organic pigment, etc. The carbon black is exemplified, for example, by furnace black, lamp black, acetylene black, channel black, etc. The inorganic pigment is exemplified, for example, by inorganic pigments based on carbon black, etc. The organic pigment is exemplified, for example, by aniline black daylight fluorescent pigment, etc. Further, any pigments different from those listed above can be used, provided that such pigments are soluble in water phase (aqueous phase). Specific examples of these pigments include, for example, C. I. Pigment Blacks 1, 6, and 7; and a solid solution of any one of the above-described pigments. The achromatic color ink may be prepared by dispersing the achromatic color pigment in water, with a dispersant. As the dispersant, it is allowable to use a general polymeric dispersant (resin for dispersing pigment, or resin-dispersing pigment), etc. Alternatively, in the achromatic color ink, the pigment of the achromatic color may be subjected to polymer capsulation.

The achromatic color pigment may be a self-dispersible pigment. The self-dispersible pigment is dispersible in water without using any dispersant, for example, owing to the fact that at least one of a hydrophilic functional group and the salt thereof including, for example, carbonyl group, hydroxyl group, carboxylic acid group, sulfonic acid group (sulfonate group), phosphoric acid group (phosphate group), etc. is introduced into the surfaces of the particles of the pigment by the chemical bond directly or with any group intervening therebetween. It is possible to use self-dispersible pigments subjected to the surface treatment by any one of methods described, for example, in Japanese Patent Application Laid-open No. HEI8-3498 (corresponding to U.S. Pat. No. 5,609,671) and Published Japanese Translation of PCT International Publication for Patent Application No. 2000-513396 (corresponding to U.S. Pat. No. 5,837,045), Published Japanese Translation of PCT International Publication for Patent Application No. 2008-524400 (corresponding to United States Patent Application Publication No. US 2006/0201380 A1), Published Japanese Translation of PCT International Publication for Patent Application No. 2009-515007 (corresponding to United States Patent Application Publications No. US 2007/0100023 A1 and No. US 2007/0100024 A1), Published Japanese Translation of PCT International Publication for Patent Application No. 2011-515535 (corresponding to United States Patent Application Publications No. US 2009/0229489 A1), etc. It is possible to use, as a material for the self-dispersible pigment, either one of the inorganic pigment and the organic pigment. Further, a pigment which is suitable for the above-described treatment includes, for example, carbon black such as "MA8" and "MA100" produced by MITSUBISHI CHEMICAL CORPORATION, etc. As the self-dispersible pigment, it is possible, for example, to use a commercially available product. The commercially available product includes, for example, "CAB-O-JET (trade name) 200", "CAB-O-JET (trade name) 300" and "CAB-O-JET (trade name) 400" produced by CABOT SPECIALTY CHEMICALS; "BONJET (trade name) BLACK CW-2" and "BONJET (trade name) BLACK CW-3" produced by ORIENT CHEMICAL INDUSTRIES, LTD.; "LIOJET (trade name) WD BLACK 002C" produced by TOYO INK MFG. CO., LTD.; and the like.

The blending amount of the achromatic color pigment (achromatic color pigment solid content amount) in the entire amount of the achromatic color ink is not particularly limited, and may be appropriately determined based on, for example, a desired optical density, etc. The achromatic color pigment solid content amount is, for example, in a range of 0.1% by weight to 20% by weight, in a range of 1% by weight to 15% by weight, or in a range of 2% by weight to 10% by weight. It is allowable that only one kind of the achromatic color pigment as described above is used singly, or two or more kinds of the achromatic color pigment are used in combination.

The achromatic color dye is not particularly limited, and is exemplified, for example, by C.I. Direct Blacks 17, 19, 32, 51, 71, 108, 146, 154 and 168; C.I. Acid Blacks 2, 7, 24, 26, 31, 52, 63, 112 and 118; C.I. Basic Black 2; C.I. Food Blacks 1 and 2; and the like.

The blending amount of the achromatic color dye in the entire amount of the achromatic color ink is not particularly limited, and is, for example, in a range of 0.1% by weight to 20% by weight, in a range of 1% by weight to 15% by weight, or in a range of 2% by weight to 10% by weight. It is allowable that only one kind of the achromatic color dye as described above is used singly, or two or more kinds of the achromatic color dye are used in combination.

The water may be ion-exchanged water or pure water (purified water). The blending amount of the water in the entire amount of the achromatic color ink may be, for example, the balance of the other components.

The achromatic color ink may further contain a water-soluble organic solvent. The water-soluble organic solvent is exemplified, for example, by a humectant which prevents the achromatic color ink from drying at an end of a nozzle in an ink-jet head, a penetrant which adjusts the drying velocity on a recording medium, etc.

The humectant is not particularly limited, and is exemplified, for example, by lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones such as acetone; ketoalcohols (ketone alcohols) such as diacetone alcohol; ethers such as tetrahydrofuran and dioxane; polyethers such as polyalkylene glycol; polyvalent alcohols such as alkylene glycol, glycerol, trimethylolpropane, trimethylolethane, etc.; 2-pyrrolidone; N-methyl-2-pyrrolidone; 1,3-dimethyl-2-imidazolidinone; and the like. The polyalkylene glycol is exemplified, for example, by polyethylene glycol, polypropylene glycol, etc. The alkylene glycol is exemplified, for example, by ethylene glycol, propylene glycol, butylene glycol, diethylene glycol, triethylene glycol, dipropylene glycol, tripropylene glycol, thiodiglycol, hexylene glycol, etc. It is allowable that only one kind of the humectant as described above is used singly, or two or more kinds of the humectant are used in combination. Among the above-described humectants, the humectant may be a polyvalent alcohol such as alkylene glycol, glycerol, etc.

The blending amount of the humectant in the entire amount of the achromatic color ink is, for example, in a range of 0% by weight to 95% by weight, in a range of 5% by weight to 80% by weight, or in a range of 5% by weight to 50% by weight.

The penetrant is not particularly limited, and is exemplified, for example, by glycol ether. The glycol ether is not particularly limited, and is exemplified, for example, by ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, tripropylene glycol-n-butyl ether, etc. One type of the penetrant may be used singly, or two or more of the penetrants may be used in combination.

The blending amount of the penetrant in the entire amount of the achromatic color ink is, for example, in a range of 0% by weight to 20% by weight, in a range of 0% by weight to 15% by weight, or in a range of 1% by weight to 4% by weight.

The achromatic color ink may further contain a conventionally known additive, as necessary. The additive is not particularly limited, and is exemplified, for example, by surfactants, pH-adjusting agents, viscosity-adjusting agents, surface tension-adjusting agents, fungicides, etc. The viscosity-adjusting agents are exemplified, for example, by polyvinyl alcohol, cellulose, water-soluble resin, etc.

The achromatic color ink can be prepared, for example, such that the achromatic colorant and water, and optionally other additive component(s) as necessary are mixed uniformly or homogeneously by any conventionally known method, and undissolved matters are removed by a filter or the like.

<Chromatic Color Ink>

Next, the at least three chromatic color inks (not less than three chromatic color inks) will be explained. The at least three chromatic color inks are required to include a combination of chromatic color inks which are mixed to thereby make it possible to form an achromatic color. Example of such a combination is exemplified, for example, by a combination of a yellow ink, a magenta ink and a cyan ink, a combination of a red ink, a green ink and a blue ink, and the like. Each of the at least three chromatic color inks contains a chromatic colorant and a solvent. In the following, although the solvent is explained as water, the solvent of the chromatic color ink is not limited to water. The colorant of the chromatic color is not particularly limited, and may be either a chromatic color pigment or a chromatic color dye. Further, a mixture of a chromatic color pigment and a chromatic color dye may be used as the chromatic colorant. The chromatic color ink can contain a chromatic color pigment. In a case that the chromatic color ink contains the chromatic color pigment, it is possible to prevent, more effectively, the bleeding in the boundary portion between the achromatic color recording area and the chromatic color recording area.

The chromatic color pigment is not particularly limited and is exemplified, for example, by an inorganic pigment, an organic pigment, etc. The inorganic pigment includes, for example, inorganic pigments based on iron oxide, etc. The organic pigment includes, for example, azo-pigments such as azo lake, insoluble azo-pigment, condensed azo-pigment, chelate azo-pigment, etc.; polycyclic pigments such as phthalocyanine pigment, perylene and perynon pigments, anthraquinone pigment, quinacridone pigment, dioxadine pigment, thioindigo pigment, isoindolinone pigment, quinophthalone pigment etc.; dye lake pigments such as basic dye type lake pigment, acid dye type lake pigment, etc.; nitro pigments; nitroso pigments; and the like. Any other pigment is also usable provided that the pigment is dispersible in a water phase (aqueous phase). Specific example of the pigments as described above include, for example, C. I. Pigment Yellows 1, 2, 3, 12, 13, 14, 15, 16, 17, 55, 73, 74, 75, 78, 83, 93, 94, 95, 97, 98, 114, 128, 129, 138, 150, 151, 154, 180, 185 and 194; C. I. Pigment Oranges 31 and 43; C. I. Pigment Reds 2, 3, 5, 6, 7, 12, 15, 16, 48, 48:1, 53:1, 57, 57:1, 112, 122, 123, 139, 144, 146, 149, 150, 166, 168, 175, 176, 177, 178, 184, 185, 190, 202, 221, 222, 224 and 238; C. I. Pigment Violet 19 and 196; C. I. Pigment Blues 1, 2, 3, 15, 15:1, 15:2, 15:3, 15:4, 16, 22 and 60; C. I. Pigment Greens 7 and 36; solid solutions of the above-listed pigments; and the like. The chromatic color ink may be prepared by dispersing the chromatic color pigment in water with a dispersant. As the dispersant, it is allowable to use, for example, any general polymeric dispersant (pigment dispersing resin), etc. Alternatively, in the chromatic color ink, the chromatic color pigment may be subjected to polymer capsulation.

The chromatic color pigment may be a self-dispersible pigment. It is possible to use, as a material for the self-dispersible pigment, either one of the inorganic pigment and the organic pigment. As the self-dispersible pigment, it is possible, for example, to use a commercially available product. The commercially available product is exemplified, for example, by "CAB-O-JET (trade name) 250C", "CAB-O-JET (trade name) 260M", "CAB-O-JET (trade name) 270Y", "CAB-O-JET (trade name) 450C", "CAB-O-JET (trade name) 465M", and "CAB-O-JET (trade name) 470Y" produced by CABOT SPECIALTY CHEMICALS; and the like.

The blending amount of the chromatic color pigment (chromatic color pigment solid content amount) in the entire amount of the chromatic color ink is not particularly limited, and may be appropriately determined based on, for example, a desired color (chromaticness, hue, tint), etc. The chromatic color pigment solid content amount is, for example, in a range of 0.1% by weight to 20% by weight, in a range of 1% by weight to 15% by weight, or in a range of 2% by weight to 10% by weight. It is allowable that only one kind of the chromatic color pigment as described above is used singly, or two or more kinds of the chromatic color pigment are used in combination.

The chromatic color dye is not specifically limited, and is exemplified, for example, by C. I. Direct Blues 6, 22, 25, 71, 86, 90, 106 and 199; C. I. Direct Reds 1, 4, 17, 28, 83 and 227; C. I. Direct Yellows 12, 24, 26, 86, 98, 132, 142 and 173; C. I. Direct Oranges 34, 39, 44, 46 and 60; C. I. Direct Violets 47 and 48; C. I. Direct Brown 109; C. I. Direct Green 59; C. I. Acid Blues 9, 22, 40, 59, 93, 102, 104, 117, 120, 167, 229 and 234; C. I. Acid Reds 1, 6, 32, 37, 51, 52, 80, 85, 87, 92, 94, 115, 180, 256, 289, 315 and 317; C. I. Acid Yellows 11, 17, 23, 25, 29, 42, 61 and 71; C. I. Acid Oranges 7 and 19; C. I. Acid Violet 49; C. I. Basic Blues 1, 3, 5, 7, 9, 24, 25, 26, 28 and 29; C. I. Basic Reds 1, 2, 9, 12, 13, 14 and 37; C. I. Basic Violets 7, 14 and 27; and the like.

The blending amount of the chromatic color dye in the entire amount of the chromatic color ink is not particularly limited, and is, for example, in a range of 0.1% by weight to 20% by weight, in a range of 1% by weight to 15% by weight, or in a range of 2% by weight to 10% by weight. It is allowable that only one kind of the chromatic color dye as described above is used singly, or two or more kinds of the chromatic color dye are used in combination.

The water is preferably ion-exchanged water or pure water (purified water). The blending amount of the water in the entire amount of the chromatic color ink may be, for example, the balance of the other components.

The chromatic color ink may further contain a water-soluble organic solvent and an additive, in a similar manner to the achromatic color ink.

The chromatic color ink can be prepared, for example, such that the chromatic colorant and water, and optionally other additive component(s) as necessary are mixed uniformly or homogeneously by any conventionally known method, and undissolved matters are removed by a filter or the like.

The ink set can satisfy the following condition (I). In a case that the ink set satisfies the following condition (I), it is possible to prevent, more effectively, the bleeding in the boundary portion between the achromatic color recording area and the chromatic color recording area.

$$K < C \qquad \text{Condition (I):}$$

in the condition (I),

K: the surface tension of the achromatic color ink (mN/m)

C: the surface tension of the at least one chromatic color ink selected from the at least three chromatic color inks used for forming the chromatic color recording area (mN/m)

In the "C" of the condition (I), the phrase "a chromatic color ink used for forming the chromatic color recording area" means, in a case of forming the chromatic color recording area by mixing chromatic color inks of at least two colors, a mixture or mixed chromatic color ink obtained by mixing the chromatic color inks of at least two colors, by a ratio adopted when forming the chromatic color recording area. The "K" and "C" of the condition (I) are, for example, in a range of 27 mN/m to 45 mN/m and in a range of 28 mN/m and 33 mN/m, respectively; and difference (C−K) between the "K" and the "C" is, for example, in a range of 0.2 mN/m to 0.5 mN/m. Further, the surface tension of an achromatic color ink used for forming the first achromatic color boundary area and the surface tension of a chromatic color ink used for forming the second achromatic color boundary area are, for example, in a range of 27 mN/m to 40 mN/m.

Next, the ink-jet recording apparatus related to the present teaching includes: an ink accommodating section, an ink-jet head and a controller. The ink accommodating section is configured to be capable of accommodating the ink set. It is allowable that the ink-jet recording apparatus related to the present teaching has a configuration similar to that of a conventional ink-jet recording apparatus, except for the configuration of the controller.

Figure 3:
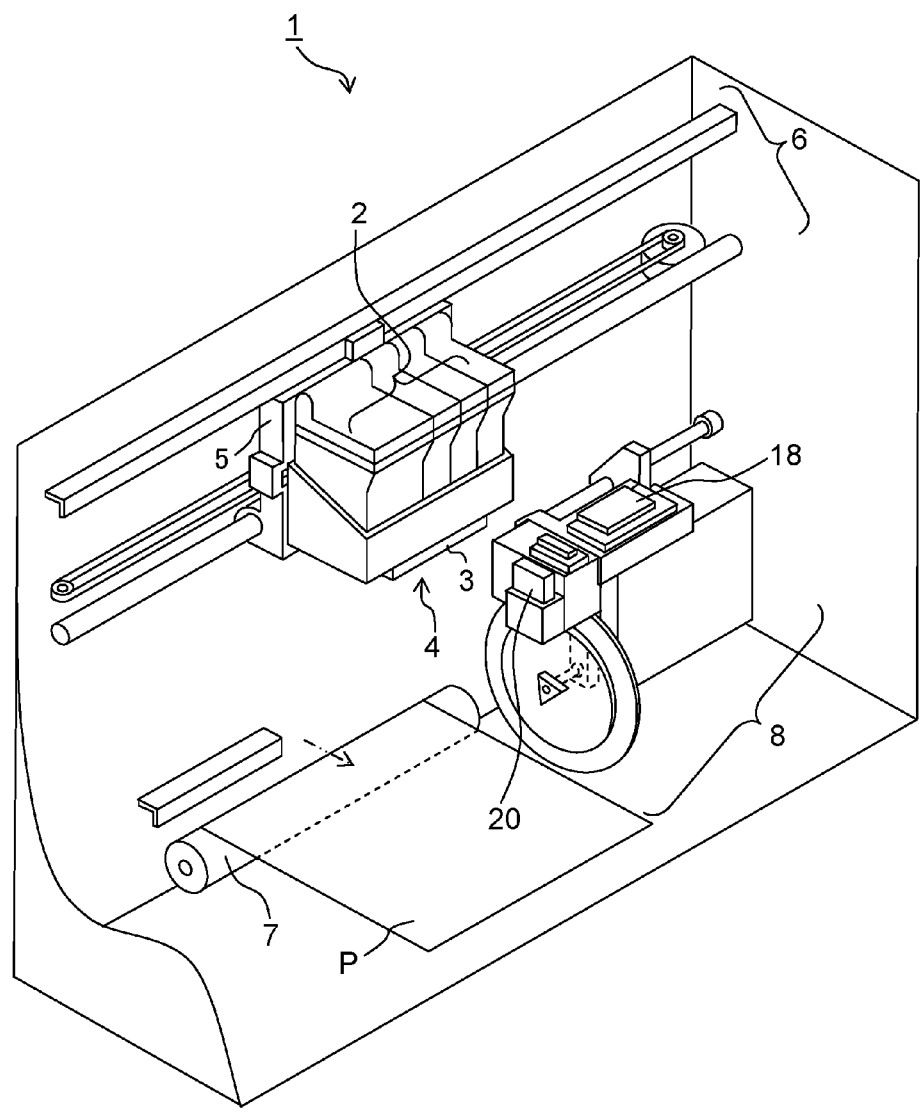
FIG. 3 is a perspective view schematically illustrating the configuration of an example of an ink-jet recording apparatus related to the present teaching.

FIG. 3 depicts the configuration of an example of the ink-jet recording apparatus related to the present teaching (except for the controller). As depicted in FIG. 3, an ink-jet recording apparatus 1 related to the present teaching includes four ink cartridges 2, an ink-jet head 3, a head unit 4, a carriage 5, a driving unit 6, a platen roller 7 and a purge device 8 as main constitutive components or parts.

The four ink cartridges 2 contain four colors of water-based inks, respectively, the four colors being yellow, magenta, cyan and black. The water-based black ink is the achromatic color ink related to the present teaching, and each of the water-based yellow, magenta and cyan inks is the chromatic color ink related to the present teaching. The ink-jet head 3 disposed on the head unit 4 performs recording on a recording medium (for example, recording paper or recording sheet) P. The four ink cartridges 2 and the head unit 4 are provided or arranged on the carriage 5. The driving unit 6 reciprocates the carriage 5 in a linear direction. As the driving unit 6, it is possible to use, for example, a conventionally known driving unit (see, for example, Japanese Patent Application laid-open No. 2008-246821 corresponding to United States Patent Application Publication No. US2008/0241398 A1). The platen roller 7 extends in the reciprocating direction of the carriage 5 and is arranged to face or be opposite to the ink-jet head 3.

The purge device 8 sucks or draws unsatisfactory ink (poor ink) which contains air bubbles, etc., accumulated or trapped in the inside of the ink-jet head 3. As the purge device 8, it is possible to use, for example, a conventionally known purge device (for example, see Japanese Patent Application laid-open No. 2008-246821 corresponding to United States Patent Application Publication No. US2008/0241398 A1).

A wiper member 20 is provided on the purge device 8, at a position on the side of the platen roller 7 such that the wiper member 20 is adjacent to the purge device 8. The wiper member 20 is formed to have a spatula shape, and wipes a nozzle-formed surface of the ink-jet head 3 accompanying with the movement (reciprocating movement) of the carriage 5. In FIG. 3, a cap 18 is provided to cover a plurality of nozzles of the ink-jet head 3 which is returned to a reset position upon completion of the recording, so as to prevent the water-based inks from drying.

In the ink-jet recording apparatus 1 of the present embodiment, the four ink cartridges 2 are provided, together with the head unit 4, on one carriage 5. However, the present teaching is not limited to this. In the ink-jet recording apparatus 1, the respective four ink cartridges 2 may be provided on a carriage which is different (separate) from the carriage on which the head unit 4 is provided. Alternatively, the respective four ink cartridges 2 may be arranged and fixed inside the ink-jet recording apparatus 1, rather than being provided on the carriage 5. In such aspects, for example, each of the four ink cartridges 2 and the head unit 4 which is provided on the carriage 5 are connected with a tube, etc., and the water-based inks are supplied from the four cartridges 2, respectively, to the head unit 4 via the tubes. Further, in these aspects, it is allowable to use four ink bottles having a bottle shape, instead of using the four ink cartridges 2. In such a case, each of the ink bottles may be provided with an inlet port via which the ink is poured from the outside to the inside of the ink bottle.

Ink-jet recording using the ink-jet recording apparatus 1 is performed, for example, in the following manner. Namely, at first, a recording paper P is supplied or fed, for example, from a paper feeding cassette or sheet feeding cassette (not depicted in the drawing) arranged at a side of or at a position below the ink-jet recording apparatus 1. The recording paper P is introduced or guided between the ink-jet head 3 and the platen roller 7. Then, a predetermined recording is performed on the fed or introduced recording paper P with the water-based ink(s) discharged or jetted from the ink-jet head 3. The recording paper P after the recording is discharged from the ink-jet recording apparatus 1. In FIG. 3, the paper feeding mechanism and paper discharge mechanism for the recording paper P are omitted in the drawing.

The ink-jet recording apparatus related to the present invention may be an ink-jet recording apparatus of a serial type as that depicted in FIG. 3, or may be an ink-jet recording apparatus of a line type.

Next, an explanation will be given, while referring to an example, about the formation of the first achromatic color boundary area and the second achromatic color boundary area in the ink-jet recording method and the ink-jet recording apparatus related to the present teaching.

Figure 4:
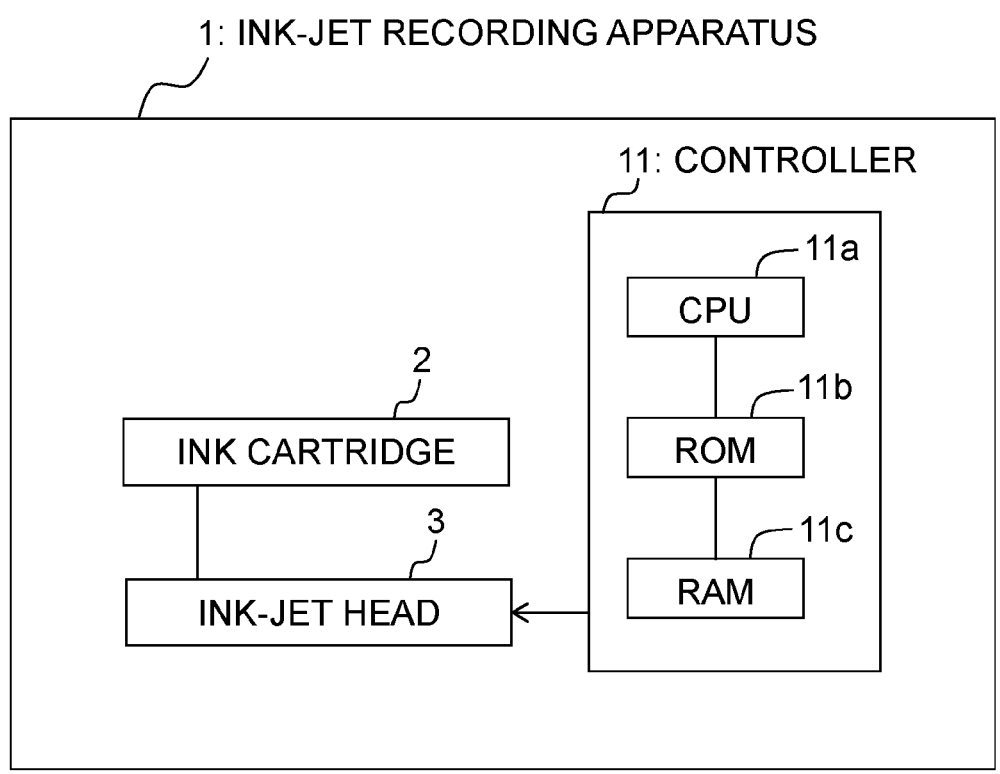
FIG. 4 is block diagram illustrating the relationship among an ink cartridge (ink accommodating section), an ink-jet head and a controller of the ink-jet recording apparatus related to the present teaching.

FIG. 4 is a block diagram depicting the relationship among the ink cartridge (ink accommodating section) 2, the ink-jet head 3 and a controller 11 in the ink-jet recording apparatus 1 related to the present teaching. In this example, the controller 11 is constructed of a Central Processing Unit (CPU) 11a, a Read Only Memory (ROM) 11b and a Random Access Memory (RAM) 11c. Note that, however, the controller 11 is not limited to and restricted by this example. Further, the controller 11 may be a personal computer connected to the ink-jet recording apparatus depicted in FIG. 3, or may be mounted on the ink-jet recording apparatus depicted in FIG. 3. The ink-jet head 3 has nozzle arrays which are provided for water-based inks of a plurality of colors, respectively, and each of which is constructed of a plurality of nozzles; the nozzle arrays are arranged, in a scanning direction of the ink-jet head 3, in an order of a nozzle array for the water-based black ink, a nozzle array for the water-based yellow ink, a nozzle array for the water-based cyan ink and a nozzle array for the water-based magenta ink. This arrangement order, however, is a mere example, and the nozzle arrays may be arranged in an order different from the above-described order.

Next, in the ink-jet recording method and the ink-jet recording apparatus related to the present teaching, the achromatic color recording area is formed in the recording medium by using at least the achromatic color ink. Further, the chromatic color recording area is formed in the recording medium by using at least one chromatic color ink which is selected from the at least three chromatic color inks. Furthermore, the boundary area is formed in the recording medium, the boundary area including the first achromatic color boundary area which is formed by (of) the achromatic color ink and the at least three chromatic color inks, and the second achromatic color boundary area which is formed by (of) the at least three chromatic color inks. In the respective formation steps as described above, the first achromatic color boundary area is located such that the first achromatic color boundary area is adjacent to the achromatic color recording area, and the second achromatic color boundary area is located such that the second achromatic color boundary area is adjacent to the chromatic color recording area; and the boundary area is formed to have a width, in a direction from the achromatic color recording area toward the chromatic color recording area, of not more than 340 μm, and the second achromatic color boundary area is formed to have a width in the above-described direction of not more than 170 μm. Here, the phrase that "the first achromatic color boundary area is located such that the first achromatic color boundary area is adjacent to the achromatic color recording area" means, for example, that dots forming the achromatic color recording area may be located adjacent to dots forming the first achromatic color boundary area in the scanning direction of the ink-jet head; that the dots forming the first achromatic color boundary area may contact with a portion or part of the dots forming the achromatic color recording area in the scanning direction of the ink-jet head; that a portion of the dots forming the achromatic color recording area may overlap with a portion of the dots forming the first achromatic color boundary area in the scanning direction of the ink-jet head; or that the dots forming the achromatic color recording area may be separated from the dots forming the first achromatic color boundary area in the scanning direction of the ink-jet head by a spacing distance of not more than one (1) dot. This applies similarly to the phrase that "the second achromatic color boundary area is located such that the second achromatic color boundary area is adjacent to the chromatic color recording area", as well.

The achromatic color recording area may be formed, for example, by using only the achromatic color ink, or may be formed by using a mixture obtained by mixing the achromatic color ink such as a black ink, etc., and a chromatic color ink such as an yellow ink, etc. The first achromatic color boundary area may be formed, for example, by discharging these four inks which are a black pigment ink, a yellow pigment ink, a cyan pigment ink and a magenta pigment ink from the respective nozzles of the ink-jet head so as to overlay the four inks on top of one another on the recording medium, as a tetra-composite black image formed on the recording medium. Here, as the achromatic color ink, the black pigment ink is used, and as the at least three chromatic color inks, the yellow pigment ink, the cyan pigment ink and the magenta pigment ink are used. In the formation of the first achromatic color boundary area, the usage amount ($K_a$) of the achromatic color ink may be smaller than a total of the usage amounts ($C_a$) of the at least three chromatic color inks, for example, may be in a range of $K_a:C_a=30:70$ to 20:80. The second achromatic color boundary area may be formed, for example, by discharging the three inks which are the yellow pigment ink, the cyan pigment ink and the magenta pigment ink from the respective nozzles of the ink-jet head so as to overlay the three inks on top of one another on the recording medium, as a tri-composite black image formed on the recording medium. In this case, as the at least three chromatic color inks, the yellow pigment ink, the cyan pigment ink and the magenta pigment ink are used.

In the present teaching, the first achromatic color boundary area and the second achromatic color boundary area are formed by using the inks for recording, at the boundary area between the achromatic color recording area and the chromatic color recording area. Accordingly, in the present teaching, since any special treating liquid different from the inks for recording is not used and any special mechanism is also not needed, it is possible to lower the cost. Further, in the present teaching, since the boundary area is formed with the achromatic color, it is possible to increase the recording quality of a recorded matter. Furthermore, in the present teaching, any achromatic color ink is not used to form the second achromatic color boundary area located adjacent to the chromatic color recording area. Therefore, the effect of suppressing the bleeding is high in the present teaching. Moreover, in the present teaching, the boundary area is formed to have the width of not more than 340 μm in the above-described direction, and the second achromatic color boundary area is formed to have the width of not more than 170 μm in the above-described direction, each of the widths thus having an extent unrecognizable to a human eye. Accordingly, the presence of the boundary area is hardly recognizable to the human. In such a manner, in the present teaching, the boundary area which is not present in the original image including the achromatic color recording area and the chromatic color recording area is formed to have the width, in the above-described direction, of which extent is not recognizable to the human eye. The width in the above-described direction of the boundary area may be, for example, in a range of 20 μm to 200 μm, or in a range of 20 μm to 170 μm. The width in above-described the direction of the second achromatic color boundary area may be, for example, not more than 100 μm, not more than 90 μm, not more than 85 μm, or not more than 20 μm. Further, the second achromatic color boundary area can be formed to have the width, in the above-described direction, which is greater than the diameter of the dot of the pixel in the chromatic color recording area adjacent to the second achromatic color boundary area. The width in the above-described direction of each of the boundary area and the second achromatic color boundary area is adjustable by controlling the diameter of the dot of an ink droplet forming each of the boundary area and the second achromatic color boundary area. In the control of the diameter of the dot, for example, an ink droplet in an amount of not more than 35 pL per 1 (one) dot is discharged onto a recording medium, with a resolution of 600 dpi×300 dpi. With the ink droplet of not more than 35 pL, it is possible to form the boundary area and the second achromatic color boundary area of which widths in the above-described direction are in the above-described ranges, respectively, in the recording area. In the present teaching, the order of forming the achromatic color recording area, the chromatic color recording area, the first achromatic color boundary area and the second achromatic color boundary area are not particularly limited. It is possible, however, to perform the formation of the first achromatic color boundary area and the formation of the second achromatic color boundary area after performing either one of the formations of the achromatic color recording area and the chromatic color recording area, and before performing the other of the formations of the achromatic color recording area and the chromatic color recording area. In such a case, it is possible to perform the formations of the achromatic color recording area, the chromatic color recording area, the first achromatic color boundary area and the second achromatic color boundary area, included in a recording area in which recording is performed when the ink-jet head is moved in the scanning direction, while the ink-jet recording is performing one scanning in the above-described direction or an opposite direction opposite to the above-described direction.

The mechanism of exhibiting the effect of suppressing the bleeding in the ink-jet recording method and the ink-jet recording apparatus related to the present teaching is presumed, for example, as follows. In the ink-jet recording, it is possible to perform recording on a various kinds of recording media. For example, in a case of recording a document including a letter (text), an image, a table, etc., an achromatic color recording area and a chromatic color recording area are adjacent to each other, in some cases. In such a case, any bleeding (blurring) is generated between the achromatic color recording area and the chromatic color recording area, which in turn lowers the quality of recording, in some cases. The cause of the generation of such bleeding (blurring) is presumed as follows: namely, a plurality of ink droplets are present on the surface of the recording medium, and ink droplets, among the plurality of ink droplets, which are adjacent to each other are mixed while water in the ink droplets are evaporated, or when the ink droplets penetrate into the inside of the recording medium, the ink droplets penetrate also to an area (unnecessary or unintended area) into which the ink droplets are not required to penetrate. Further, this phenomenon of bleeding is known to be prominent or conspicuous in such a case that an achromatic color ink which is highly visible on the recording medium (for example, a black ink) is mixed with or penetrate to a chromatic color ink which is relatively less visible on the recording medium (for example, a yellow ink). In view of this situation, in the present teaching, the second achromatic color boundary area formed of the at least three chromatic color inks is present between the chromatic color recording area, and the achromatic color recording area and the first achromatic color boundary area each of which is formed by using the achromatic color ink. Accordingly, any penetration of the achromatic color ink into the chromatic color recording area is not visibly recognizable (observable), and a high recording quality can be achieved. Further, the first achromatic color boundary area is formed between the achromatic color recording area and the second achromatic color boundary area. With this, the brightness (of the color) is increased from the achromatic color recording area to the chromatic color recording area, thereby making the change in brightness to be stepwise, which in turn makes a recorded image to be more natural. This mechanism, however, is merely a presumption, and the present teaching is not limited to and restricted by this presumed mechanism.

Figure 1B:
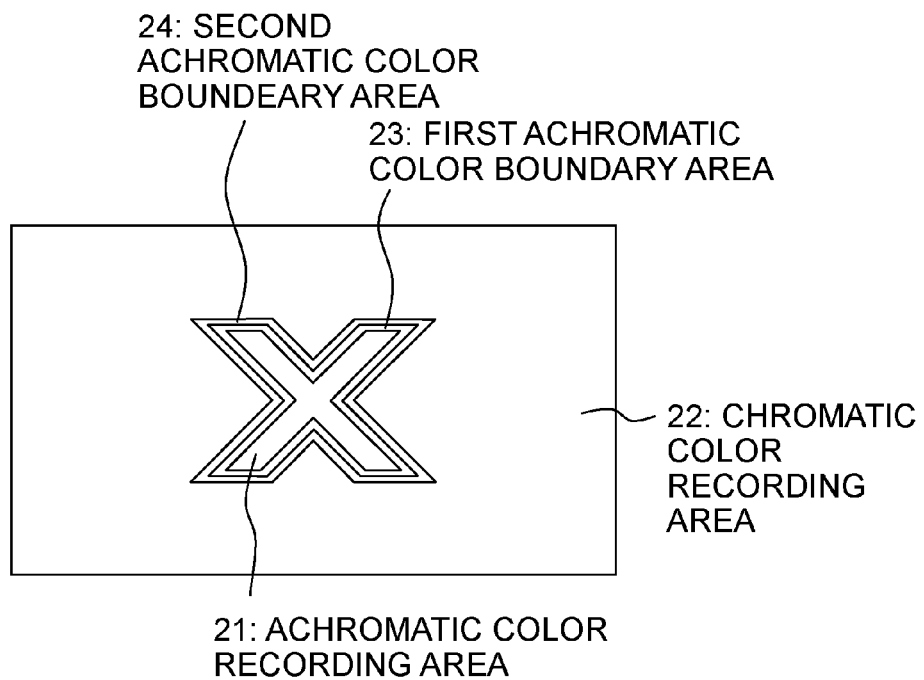

FIG. 1A and FIG. 1B each depict an example of construction of an achromatic color recording area 21, a chromatic color recording area 22, a first achromatic color boundary area 23 and a second achromatic color boundary area 24. For example, in such a case that the achromatic color recording area 21 and the chromatic color recording area 22 are recorded to be adjacent to each other, as depicted in FIG. 1A, it is allowable to form the achromatic color recording area 21, then form the first achromatic color boundary area 23 to be adjacent to the achromatic color recording area 21, then form the second achromatic color boundary area 24 to be adjacent to the first achromatic color boundary area 23, and then form the chromatic color recording area 22 at a position on a side of the second achromatic color boundary area 24 which is opposite to the first achromatic color boundary area 23. Other than the example as depicted in FIG. 1A, is it also allowable to form an achromatic color recording area 21 as a letter or an image, then form a first achromatic color boundary area 23 and a second achromatic color boundary area 24 around (on the periphery of) the achromatic color recording area 21, and then form a chromatic color recording area 22 as a background, as depicted in FIG. 1B. It is allowable to form the first achromatic color boundary area 23 and the second achromatic color boundary area 24 in an area which should be occupied by the achromatic color recording area 21, or in an area which should be occupied by the chromatic color recording area 22, or to form straddling both of the achromatic color recording area 21 and the chromatic color recording area 22. It is possible to convert an image data of the achromatic color recording area which is to be originally formed of the dots of the achromatic color to thereby form the first achromatic color boundary area 23 and the second achromatic color boundary area 24. Further, in FIGS. 1A and 1B, the achromatic color recording area 21 and the first achromatic color boundary area 23 are in contact with each other, the first achromatic color boundary area 23 and the second achromatic color boundary area 24 are in contact with each other, and the second achromatic color boundary area 24 and the chromatic color recording area 22 are in contact with each other. It is allowable, however, that an intervening area in which any ink is not discharged is present between the achromatic color recording area 21 and the first achromatic color boundary area 23, between the first achromatic color boundary area 23 and the second achromatic color boundary area 24, and/or between the second achromatic color boundary area 24 and the chromatic color recording area 22.

Figure 2:
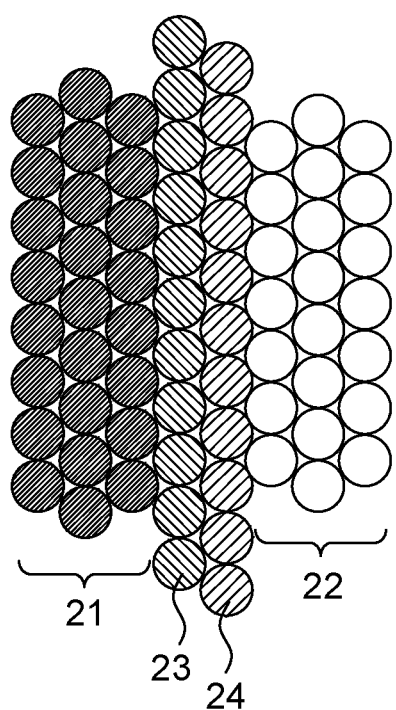
FIG. 2 is a drawing for explaining recording dots in the first and second achromatic color boundary areas.

In the ink-jet recording method and the ink-jet recording apparatus related to the present teaching, it is possible to form each of the first achromatic color boundary area and the second achromatic color boundary area to have the width in the above-described direction which is not more than 100 μm. In this case, as depicted in FIG. 2, it is allowable to form a first achromatic color boundary area 23 formed of a plurality of aligned single (1) dots and a second achromatic color boundary area 24 formed of a plurality of aligned single (1) dots, between the achromatic color recording area 21 and the chromatic color recording area 22. With this, the boundary area becomes visually unrecognizable, in an ensured manner, to the human eye, and the achromatic color recording area 21 and the chromatic color recording area 22 appear more sharply. In this case, the dots of the achromatic color ink and the dots of the at least three chromatic color inks constructing the first achromatic color boundary area 23 may be overlapped with one another completely; alternatively, even if the dots of the achromatic color ink and the dots of the at least three chromatic color inks constructing the first achromatic color boundary area 23 are not overlapped with one another completely, the dots may be considered as a plurality of aligned single (1) dots. Similarly, the dots of the at least three chromatic color inks constructing the second achromatic color boundary area 24 may be overlapped with one another completely; alternatively, even if the dots of the at least three chromatic color inks constructing the second achromatic color boundary area 24 are not overlapped with one another completely, the dots may be considered as a plurality of aligned single (1) dots. Further, the first achromatic color boundary area 23 formed of the plurality of aligned single (1) dots may also be formed of a plurality of adjacent pixels for recording (recording pixels) which are obtained by discharging the achromatic color ink and the at least three chromatic color inks onto locations each corresponding to one of the plurality of adjacent recording pixels. Similarly, the second chromatic color boundary area 24 formed of the plurality of aligned single (1) dots may also be formed of a plurality of adjacent pixels for recording (recording pixels) which are obtained by discharging the at least three chromatic color inks onto locations each corresponding to one of the plurality of adjacent recording pixels.

Figure 5:
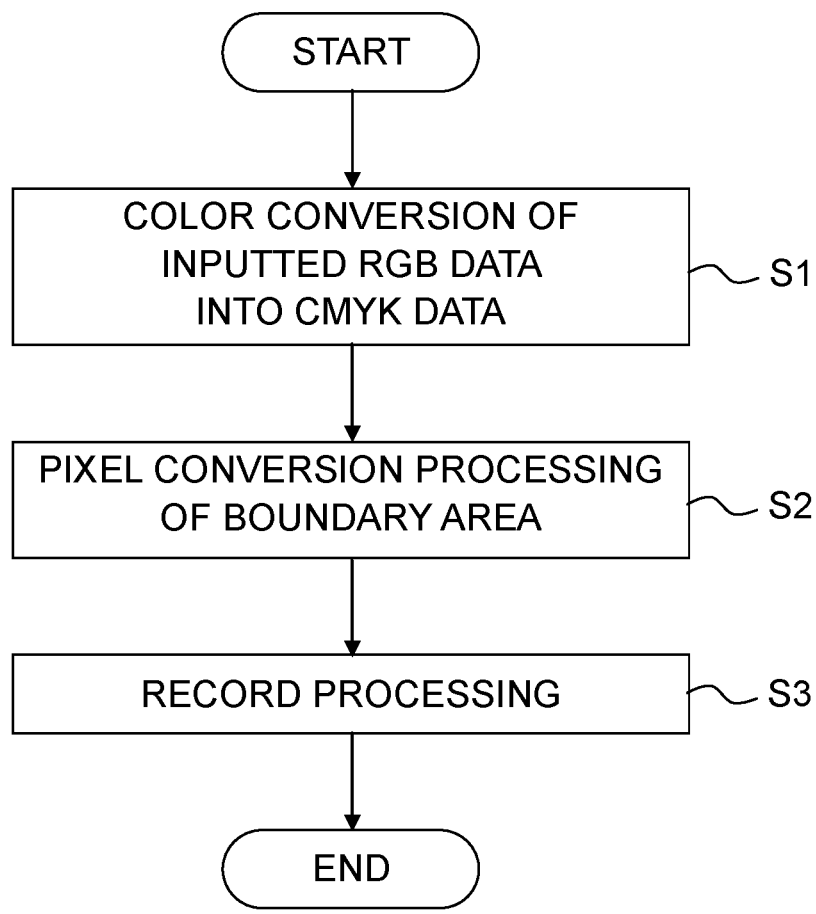
FIG. 5 is a flow chart illustrating an example of an ink-jet recording method related to the present teaching.
Figure 7:
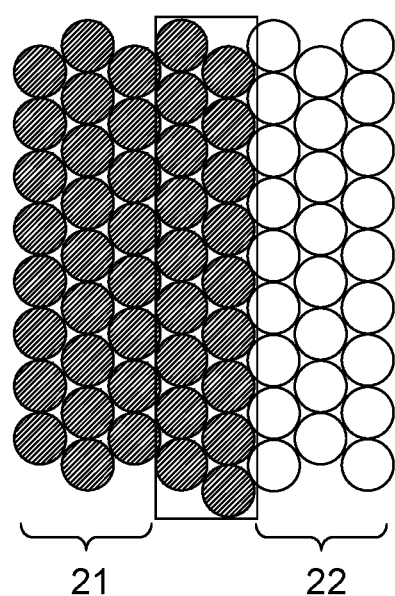
FIG. 7 is a drawing for explaining the boundary area.

FIG. 5 is a flow chart depicting an example of the ink-jet recording method related to the present teaching. This example is such an example wherein, for example, in an ink-jet recording apparatus having a copying function, a user instructs the ink-jet recording apparatus to execute a copying operation (recording operation) of a recorded matter. In this example, an area corresponding to one pixel included in an image data corresponds to one ink discharge area, and one kind of dot or a plurality of kinds of dots (for example, four kinds that are CMYK (cyan, magenta, yellow and black) may be formed in one ink discharge area. Here, it is provided that an image is to be recorded in this example, the image including a portion in which dots which should be originally formed as the achromatic color recording area 21 and dots which should be originally formed as the chromatic color recording area 22 are adjacent to each other, as depicted in FIG. 7. In this example, the boundary area (first and second achromatic color boundary areas) is formed in an area which should be the boundary at which the achromatic color recording area 21 and the chromatic color recording area 22 are adjacent to each other. Note that the phrase "an area which should be the boundary at which the achromatic color recording area 21 and the chromatic color recording area 22 are adjacent to each other" corresponds, in this example, an area within a frame in FIG. 7. In FIG. 7, there is such a fear that the achromatic color ink used for forming the achromatic color recording area 21 might flow into the chromatic color recording area 22 to thereby generate any bleeding in the boundary area between the achromatic color recording area 21 and the chromatic color recording area 22 and in the vicinity of the boundary area. Therefore, the formation of the boundary area is required. As depicted in FIG. 5, when the recording operation is started, the CPU 11*a* performs, for example, input of image information about each of the pixels of RGB (red, green, blue) data, and performs calibration (correction) processing such as gamma correction, etc., for the inputted image information, and the CPU 11*a* performs color conversion of each of the pixels into CMYK data (image data for record processing) (Step S1). The color conversion processing of converting each of the pixels from the RGB data to the CYMK data may be such a processing wherein the color change from the RGB data to the CMY data is performed, and then generation of black (K) data, removal of under color (UCR: Under Color Removal), etc., are performed; alternatively, the color conversion processing may be such a processing wherein a look-up table and an interpolation circuit are used so as to convert the RGB data directly to the CMYK data. Note that in a case that the pixel density of the image data is different from the pixel density for the record processing, the CPU 11a may perform a processing for converting the pixel density of the image data into the pixel density for the record processing. Alternatively, the CPU 11a transforms or digitizes the image data (gradation data) of each of the color components (C, M, Y, K) into a binary representation by using a predetermined threshold value, and generates a recording data composed of bit values (1 or 2) of the respective color components. The generated recording data is stored in at least one of the ROM 11b and the RAM 11c.

Figure 6:
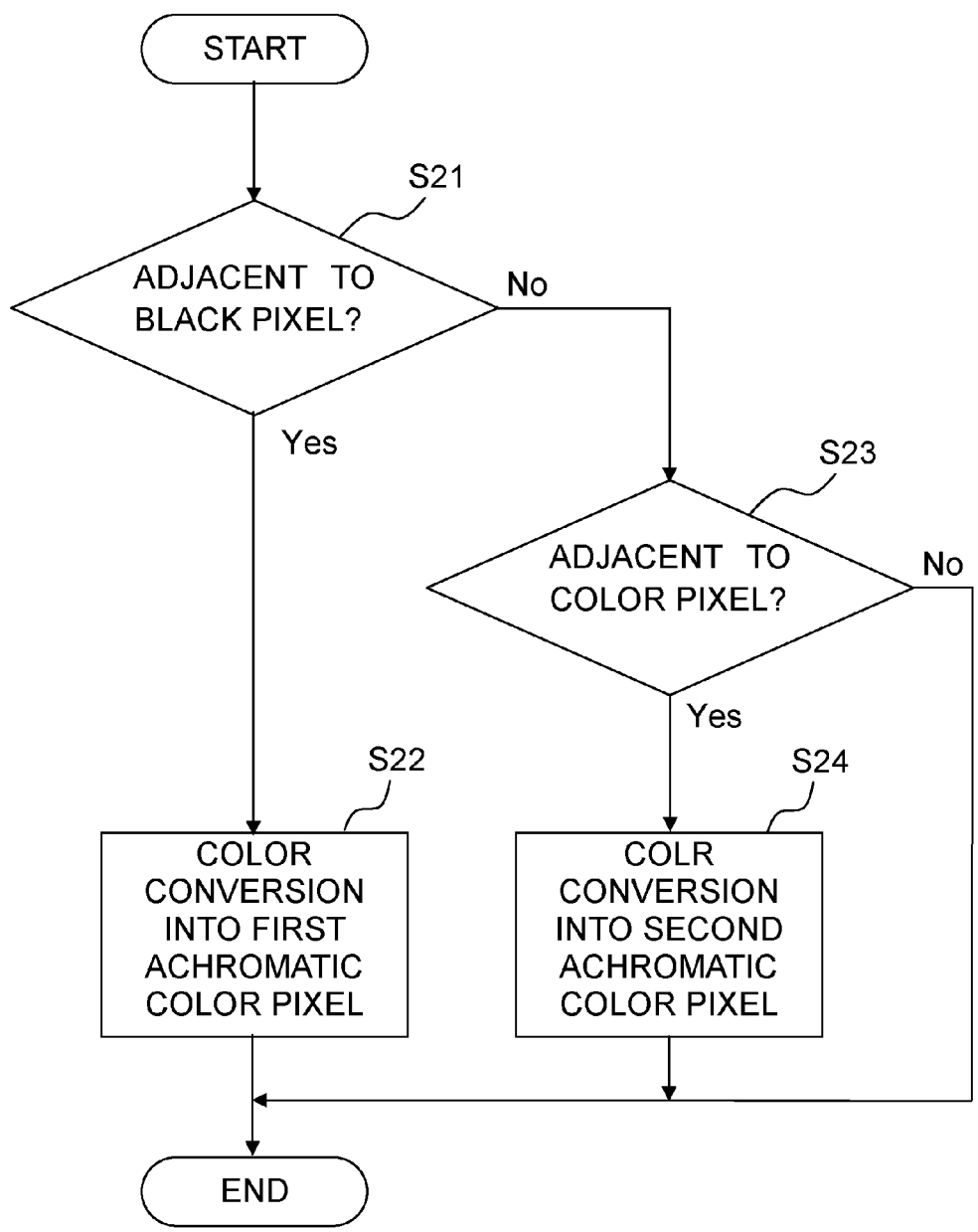
FIG. 6 is a flow chart illustrating an example of a pixel conversion processing for the pixels in a boundary area in the ink-jet recording method illustrated in FIG. 5.

Next, the CPU 11a performs selection of a portion at which the boundary area is to be formed (boundary area-formation portion). For example, the CPU 11a selects black pixels for the record processing which are included in a plurality of black pixels and which should originally be located at the boundary between the plurality of black pixels and a plurality of color pixels, namely, black pixels forming aligned single (1) pixels which should originally be located to be adjacent to the color pixels, as a portion at which the second achromatic color boundary area is to be formed; and the CPU 11a selects, aligned single black pixels for the record processing which are included in the plurality of black pixels and which are located to be apart from the plurality of color pixels by a distance corresponding to two (2) pixels, as a portion at which the first achromatic color boundary area is to be formed. Note that in this example, one piece of the pixel area corresponding to one piece of the recording pixel corresponds to one piece of the discharge area. Further, in this example, the black pixels are considered as the pixels corresponding to the boundary area. However, black pixels and color pixels adjacent to each other may be subjected to the color conversion as the boundary area, or the color pixels may be considered as the pixels corresponding to the boundary area. Furthermore, the information about the boundary area-formation portion may be stored, in advance, in at least one of the ROM 11b and the RAM 11c, as setting information. Next, the CPU 11a performs a pixel conversion processing regarding the boundary area (Step S2). This step is performed, for example, as follows. Namely, as depicted in FIG. 6, at first, the CPU 11a judges whether or not the boundary area-formation portion is adjacent to the black pixels (Step S21). In a case that the boundary area-formation portion is judged to be adjacent to the black pixels (Step S21: YES), then CPU 11a performs, in the color conversion processing, the color-conversion of the boundary area-forming portion into first achromatic color pixels (pixels expressing an achromatic color by using the four colors that are black, cyan, magenta and yellow in this example) (Step S22). On the other hand, in a case that the boundary area-formation portion is judged to be not adjacent to the black pixels (Step S21: NO), then the CPU 11a judges whether or not the boundary area-formation portion is adjacent to the color pixels (Step S23). In a case that the boundary area-formation portion is judged to be adjacent to the color pixels (Step S23: YES), then CPU 11a performs, in the color conversion processing, the color-conversion of the boundary area-forming portion into second achromatic color pixels (pixels expressing an achromatic color by using the three colors that are cyan, magenta and yellow in this example) (Step S24). On the other hand, in a case that the boundary area-formation portion is judged to be not adjacent to the color pixels (Step S23: NO), then the step for forming the boundary area is not required, and thus the CPU 11a finishes the processing without forming the first achromatic color boundary area and the second achromatic color boundary area. After finishing the pixel conversion processing of the boundary area, the CPU 11a performs a record processing based on the pixel data generated in Step S1 and Step S2 (Step S3). In a case of a serial-type ink-jet head in which the ink-jet head 3 operates in the scanning direction, in the recording operation, the inks are discharged based on the recording information included in the pixel data, depending on the position of the ink-jet head 3. Note that the color conversion process for generating the pixel data for record processing in Step 1 and the pixel conversion processing regarding the boundary area in Step 2 may be collectively performed together as a (combined) one step. Further, in this example, the first achromatic color boundary area using the black, cyan, magenta and yellow and the second achromatic color boundary area using the cyan, magenta and yellow are formed in the area between the achromatic color recording area and the chromatic color recording area. It is allowable, however, to perform conversion such that pixels, among the plurality of pixels formed in the black color (ink), which are adjacent to the color pixels, are converted. Namely, with respect to black pixels, among the plurality of black pixels, which are adjacent to the color pixels, may be subjected to the pixel conversion so as to form the second achromatic color boundary area by using the cyan, magenta and yellow colors, and with respect to black pixels, among the plurality of black pixels, which are adjacent to the second achromatic color boundary area, may be subjected to pixel conversion so as to form the first achromatic color boundary area by using the black, cyan, magenta and yellow colors.

The CPU 11a perform ON/OFF driving control of the ink-jet head 3 based on the recording data and bit values (1 or 0) of the respective color components in the boundary area which are stored in at least one of the ROM 11b and the RAM 11c. With this, the achromatic color recording area, the first achromatic color boundary area, the second achromatic color boundary area, and the chromatic color recording area are formed in the recording medium.

EXAMPLES

Next, examples related to the present teaching will be explained together with comparative examples. Note that the present teaching is not limited by and is not restricted to the examples and the comparative examples which will be described below.

<Preparation of Aqueous Carbon Black Dispersion 1>

40 g of Carbon black "#2650" produced by MITSUBISH CHEMICAL CORPORATION was mixed with 200 g of ion-exchanged water, followed by being pulverized by a bead mill. The pulverized mixture was added with a carboxyl group agent, followed by being heated and agitated, and subjected to an oxidation processing. The obtained liquid was cleaned with a solvent for a several times, was poured into water, and was cleaned again with the water in a repeated manner. Then, the liquid was filtrated with a filter, and thus a water (aqueous) carbon black dispersion 1 was prepared. The average particle diameter (size) of the carbon black contained in the aqueous carbon black dispersion 1 was measured by using a dynamic light scattering nanoparticle size analyzer "LB-550" (product name) manufactured by HORIBA, LTD., and the average particle diameter was 156 nm.

<Preparation of Aqueous Carbon Black Dispersion 2>

Aqueous carbon black dispersion 2 was prepared by a method similar to that for preparing the aqueous carbon black dispersion 1, except that the preparation parameter was changed from that in preparing the aqueous carbon black dispersion 1. The average particle diameter of the carbon black contained in the aqueous carbon black dispersion 2 was measured by using the dynamic light scattering nano-particle size analyzer "LB-550" (product name) manufactured by HORIBA, LTD., and the average particle diameter was 125 nm.

<Preparation of Achromatic Color Ink>

Components, except for the aqueous carbon black dispersion or CAB-O-JET (trade name) 200, which were included in Ink Composition (TABLE 1) as indicated below were mixed uniformly or homogeneously; and thus an ink solvent was obtained.

Subsequently, the ink solvent was added to the aqueous carbon black dispersion or CAB-O-JET (trade name) 200 which was dispersed in water, followed by being mixed uniformly. After that, the obtained mixture was filtrated through a cellulose acetate membrane filter (pore size 3.00 μm) produced by TOYO ROSHI KAISHA, LTD., and thus each of achromatic color inks Bk-1 to Bk-6 as indicated in TABLE 1 were obtained.

<Preparation of Chromatic Color Ink Using Pigment>

Components, except for CAB-O-JET (trade name) 270Y, CAB-O-JET (trade name) 260M or CAB-O-JET (trade name) 250C, which were included in Ink Composition (TABLE 1) as indicated below were mixed uniformly or homogeneously; and thus an ink solvent was obtained. Subsequently, the ink solvent was added to CAB-O-JET (trade name) 270Y, CAB-O-JET (trade name) 260M or CAB-O-JET (trade name) 250C which was dispersed in water, followed by being mixed uniformly. After that, the obtained mixture was filtrated through a cellulose acetate membrane filter (pore size 3.00 μm) produced by TOYO ROSHI KAISHA, LTD., and thus each of chromatic color inks Y-1 to Y-4, M-1 and C-1 as indicated in TABLE 1 were obtained.

<Preparation of Chromatic Color Ink Using Dye>

Components which were included in Ink Composition (TABLE 1) as indicated below were mixed uniformly or homogeneously; and thus a mixture was obtained. Subsequently, the obtained mixture was filtrated through a hydrophilic polytetrafluoroethylene (PTFE)-type membrane filter (pore size 0.20 μm) produced by TOYO ROSHI KAISHA, LTD., and thus each of chromatic color inks Y-5, M-2 and C-2 as indicated in TABLE 1 were obtained.

TABLE 1

|  |  | ACHROMATIC COLOR INK | | | | | |
|---|---|---|---|---|---|---|---|
|  |  | Bk-1 | Bk-2 | Bk-3 | Bk-4 | Bk-5 | Bk-6 |
| Ink Composition (% by weight) | Aqueous carbon black dispersion (*1) | 7.5 | 7.0 | 7.5 | — | — | — |
|  | Aqueous carbon black dispersion (*2) | — | — | — | 6.0 | — | — |
|  | CAB-O-JET (trade name) 200 (*3) | — | — | — | — | 8.0 | 8.0 |
|  | CAB-O-JET (trade name) 270Y (*4) | — | — | — | — | — | — |
|  | C.I. Direct Yellow 86 | — | — | — | — | — | — |
|  | CAB-O-JET (trade name) 260M (*5) | — | — | — | — | — | — |
|  | C.I. Acid Red 289 | — | — | — | — | — | — |
|  | CAB-O-JET (trade name) 250C (*6) | — | — | — | — | — | — |
|  | C.I. Direct Blue 199 | — | — | — | — | — | — |
|  | Glycerol | 12.0 | 12.0 | 11.0 | 10.0 | 14.5 | 14.0 |
|  | Triethylene glycol | 4.0 | 4.0 | 4.0 | 10.0 | — | 4.0 |
|  | Tripropylene glycol | — | — | — | — | 4.0 | — |
|  | Triethylene glycol-n-butyl ether | 4.0 | 4.0 | 4.0 | — | — | — |
|  | Tripropylene glycol methyl ether | — | — | — | 4.0 | 4.0 | 4.0 |
|  | OLFIN (trade name) E1010 (*7) | — | — | — | 0.3 | 0.5 | — |
|  | OLFIN (trade name) E1004 (*8) | 0.3 | 0.4 | 0.2 | — | — | 0.4 |
|  | SUNNOL (trade name) NL-1430 (*9) | 0.5 | 0.5 | 0.5 | 0.2 | 0.5 | 0.5 |
|  | Water | balance | balance | balance | balance | balance | balance |

|  |  | CHROMATIC COLOR INK | | | | |
|---|---|---|---|---|---|---|
|  |  | Y-1 | Y-2 | Y-3 | Y-4 | Y-5 |
| Ink Composition (% by weight) | Aqueous carbon black dispersion (*1) | — | — | — | — | — |
|  | Aqueous carbon black dispersion (*2) | — | — | — | — | — |
|  | CAB-O-JET (trade name) 200 (*3) | — | — | — | — | — |
|  | CAB-O-JET (trade name) 270Y (*4) | 4.0 | 3.8 | 4.0 | 3.8 | — |
|  | C.I. Direct Yellow 86 | — | — | — | — | 4.0 |
|  | CAB-O-JET (trade name) 260M (*5) | — | — | — | — | — |

TABLE 1-continued

|  | | | | | |
|---|---|---|---|---|---|
| C.I. Acid Red 289 | — | — | — | — | — |
| CAB-O-JET (trade name) 250C (*6) | — | — | — | — | — |
| C.I. Direct Blue 199 | — | — | — | — | — |
| Glycerol | 18.0 | 17.0 | 17.0 | 17.0 | 18.0 |
| Triethylene glycol | — | — | — | — | — |
| Tripropylene glycol | 5.0 | 5.0 | 5.0 | 5.0 | 5.0 |
| Triethylene glycol-n-butyl ether | 2.0 | 2.0 | 2.0 | 4.0 | 3.0 |
| Tripropylene glycol methyl ether | — | — | — | — | — |
| OLFIN (trade name) E1010 (*7) | — | — | — | — | 0.2 |
| OLFIN (trade name) E1004 (*8) | 0.9 | 0.9 | 0.9 | 1.5 | — |
| SUNNOL (trade name) NL-1430 (*9) | 0.3 | 0.5 | 0.5 | 0.3 | 0.3 |
| Water | balance | balance | balance | balance | balance |

| | | CHROMATIC COLOR INK | | | |
|---|---|---|---|---|---|
| | | M-1 | M-2 | C-1 | C-2 |
| Ink Composition (% by weight) | Aqueous carbon black dispersion (*1) | — | — | — | — |
| | Aqueous carbon black dispersion (*2) | — | — | — | — |
| | CAB-O-JET (trade name) 200 (*3) | — | — | — | — |
| | CAB-O-JET (trade name) 270Y (*4) | — | — | — | — |
| | C.I. Direct Yellow 86 | — | — | — | — |
| | CAB-O-JET (trade name) 260M (*5) | 5.4 | — | — | — |
| | C.I. Acid Red 289 | — | 4.5 | — | — |
| | CAB-O-JET (trade name) 250C (*6) | — | — | 3.5 | — |
| | C.I. Direct Blue 199 | — | — | — | 4.5 |
| | Glycerol | 11.0 | 13.0 | 11.0 | 13.0 |
| | Triethylene glycol | — | — | — | — |
| | Tripropylene glycol | 5.0 | 5.0 | 5.0 | 5.0 |
| | Triethylene glycol-n-butyl ether | 4.0 | 1.5 | 4.0 | 4.0 |
| | Tripropylene glycol methylether | — | — | — | — |
| | OLFIN (trade name) E1010 (*7) | — | 1.5 | — | 0.2 |
| | OLFIN (trade name) E1004 (*8) | 0.2 | — | 0.5 | — |
| | SUNNOL (trade name) NL-1430 (*9) | 0.3 | 0.5 | 0.3 | 0.2 |
| | Water | balance | balance | balance | balance |

LEGEND
*1 numerals in the table indicate the solid content blending amount.
*2 numeral in the table indicates the solid content blending amount.
*3 Self-dispersible carbon black; produced by CABOT SPECIALTY CHEMICALS, INC.; average particle diameter: 130 nm; numerals in the table indicate solid content blending amount.
*4 Self-dispersible yellow pigment; produced by CABOT SPECIALTY CHEMICALS, INC.; numerals in the table indicate solid content blending amount.
*5 Self-dispersible magenta pigment; produced by CABOT SPECIALTY CHEMICALS, INC.; numeral in the table indicates solid content blending amount.
*6 Self-dispersible cyan pigment; produced by CABOT SPECIALTY CHEMICALS, INC.; numeral in the table indicates solid content blending amount.
*7 nonionic surfactant; produced by NISSHIN CHEMICAL CO., LTD.
*8 nonionic surfactant; produced by NISSHIN CHEMICAL CO., LTD.
*9 anionic surfactant; produced by LION SPECIALTY CHEMICALS CO., LLD.

Example 1-1

The ink-jet recording apparatus as depicted in FIG. 3 was used to form, on a sheet of a plain paper (plain paper "Xerox Xceed (trade name)" produced by XEROX CORPORATION), an achromatic color recording area, a first achromatic color boundary area, a second achromatic color boundary area, and a chromatic color recording area in the above-described order, with the following steps.

<Achromatic Color Recording Area>

The achromatic color recording area was formed by using the achromatic color ink Bk-2.

<First Achromatic Color Boundary Area>

The first achromatic color boundary area of which width in the above-described direction was 85 μm was formed by using the achromatic color ink Bk-2 and the chromatic color inks Y-2, M-1 and C-1 (each in an amount of not more than 35 pL) such that the first achromatic color boundary area was in contact with the achromatic color recording area.

<Second Achromatic Color Boundary Area>

The second achromatic color boundary area of which width in the above-described direction was 85 μm was formed by using the chromatic color inks Y-2, M-1 and C-1 (each in an amount of not more than 35 pL) such that the second achromatic color boundary area was in contact with the first achromatic color boundary area on a side opposite to the achromatic color recording area.

<Chromatic Color Recording Area>

The chromatic color recording area was formed by using the chromatic color ink Y-2 such that the chromatic color recording area was in contact with the second achromatic color boundary area on a side opposite to the first achromatic color boundary area.

Comparative Example 1-1

The ink-jet recording apparatus as depicted in FIG. 3 was used to form, on a sheet of the above-described plain paper, an achromatic color recording area with the achromatic color ink Bk-2, and then the ink-jet recording apparatus was used to form a chromatic color recording area with the chromatic color ink Y-2 such that the chromatic color recording area was in contact with the achromatic color recording area.

Comparative Example 1-2

The ink-jet recording apparatus as depicted in FIG. 3 was used to form, on a sheet of the above-described plain paper, an achromatic color recording area with the achromatic color ink Bk-2, and then the ink-jet recording apparatus was used to form a chromatic color recording area with the chromatic color ink Y-2 while partially thinning a portion, of the chromatic color recording area, which was in contact with the achromatic color recording area.

Comparative Example 1-3

The ink-jet recording apparatus as depicted in FIG. 3 was used to form, on a sheet of the above-described plain paper, an achromatic color recording area, an achromatic color boundary area, and a chromatic color recording area in the above-described order, with the following steps.

<Achromatic Color Recording Area>

The achromatic color recording area was formed by using the achromatic color ink Bk-2.

<Achromatic Color Boundary Area>

The achromatic color boundary area of which width in the above-described direction was 85 μm was formed by using the chromatic color inks Y-2, M-1 and C-1 (each in an amount of not more than 35 pL) such that the achromatic color boundary area was in contact with the achromatic color recording area.

<Chromatic Color Recording Area>

The chromatic color recording area was formed by using the chromatic color ink Y-2 such that the chromatic color recording area was in contact with the achromatic color boundary area on a side opposite to the achromatic color recording area.

Comparative Example 1-4

The ink-jet recording apparatus as depicted in FIG. 3 was used to form, on a sheet of the above-described plain paper, an achromatic color recording area, an achromatic color boundary area, and a chromatic color recording area in the above-described order, with the following steps.

<Achromatic Color Recording Area>

The achromatic color recording area was formed by using the achromatic color ink Bk-2.

<Achromatic Color Boundary Area>

The achromatic color boundary area of which width in the above-described direction was 85 μm was formed by using the achromatic color ink Bk-2 and the chromatic color inks Y-2, M-1 and C-1 (each in an amount of not more than 35 pL) such that the achromatic color boundary area was in contact with the achromatic color recording area.

<Chromatic Color Recording Area>

The chromatic color recording area was formed by using the chromatic color ink Y-2 such that the chromatic color recording area was in contact with the achromatic color boundary area on a side opposite to the achromatic color recording area.

With respect to Example 1-1 and Comparative Examples 1-1 to 1-4, (a) measurement of Raggedness (Rag), (b) evaluation of difference in density between the respective areas, and (c) sensory evaluation by visual observation were performed by the following methods.

(a) Measurement of Raggedness (Rag)

Raggedness (Rag) in the boundary between the achromatic color recording area and the chromatic color recording area in each of Example 1-1 and Comparative Examples 1-1 to 1-4 was measured in conformity with ISO-13660. Here, the term "Raggedness (Rag)" means raggedness of a line as defined in ISO-13600, wherein a term "ragged line" means a meandering (waving, non-uniform or distorted) state as compared with an ideal line edge which should primarily be smooth and straight. As the value of the Rag is smaller, it is possible to judge that the bleeding in the boundary between the achromatic color recording area and the chromatic color recording area is more suppressed.

(b) Evaluation of the Difference in Density Between the Respective Areas

In Example 1-1, the differences in density among the achromatic color recording area, the first achromatic color boundary area, the second achromatic color boundary area and the chromatic color recording area, respectively, were visually evaluated. In Comparative Example 1-2, the difference in density between the achromatic color recording area and the chromatic color recording area was visually evaluated. In each of Comparative Examples 1-3 and 1-4, the differences in density among the achromatic color recording area, the achromatic color boundary area and the chromatic color recording area, respectively, were visually evaluated.

(c) Sensory Evaluation by Visual Observation

In each of Example 1-1 and Comparative Examples 1-1 to 1-4, the achromatic color recording area, the first achromatic color boundary area, the second achromatic color boundary area and the chromatic color recording area were visually observed (in each of Comparative Examples 1-1 and 1-2, the achromatic color recording area and the chromatic color recording area were visually observed; and in each of Comparative Examples 1-3 and 1-4, the achromatic color recording area, the achromatic color boundary area and the chromatic color recording area were visually observed), and were evaluated based on the following evaluation criterion.

<Evaluation Criterion for Sensory Evaluation by Visual Observation>

A: There was not any unnaturalness in the bleeding between the respective areas and in the density in the respective areas, and was satisfactory.

B: There was unnaturalness in either one of the bleeding between the respective areas and in the density in the respective areas.

C: There was unnaturalness in both of the bleeding between the respective areas and the density in the respective areas.

The results of measurements and evaluations of Example 1-1 and Comparative Examples 1-1 to 1-4 are indicated in TABLE 2 below.

TABLE 2

|  | Example | Comparative Example | | | |
|---|---|---|---|---|---|
|  | 1-1 | 1-1 | 1-2 | 1-3 | 1-4 |
| Achromatic color ink used for formation of achromatic color recording area | Bk-2 | Bk-2 | Bk-2 | Bk-2 | Bk-2 |
| Chromatic color ink used for formation of chromatic color recording area | Y-2 | Y-2 | Y-2 | Y-2 | Y-2 |
| Inks used for formation of achromatic color boundary area(s) | First: (Bk-2, Y-2, M-1, C-1); Second: (Y-2, M-1, C-1) | — | — | Y-2, M-1, C-1 | Bk-2, Y-2, M-1, C-1 |
| Measurement of Rag | 24.0 | 28.1 | 25.3 | 27.2 | 25.4 |
| Evaluation of density between the respective areas | Small | — | Large | Large | Small |
| Sensory evaluation by visual observation | A | C | B | C | A |

As indicated in TABLE 2, Example 1-1 had satisfactory results in all of the measurement of Rag, the evaluation of the density between the respective areas and the sensory evaluation by visual observation. On the other hand, Comparative Examples 1-1 and 1-2 in each of which any achromatic color boundary area was not formed, and Comparative Examples 1-3 and 1-4 in each of which only one achromatic color boundary area was formed each had a measured value of Rag greater than that of Example 1-1; further, Comparative Example 1-1 also had unsatisfactory result in the sensory evaluation by visual observation, as compared with that in Example 1-1; furthermore, Comparative Examples 1-2 and 1-3 also had unsatisfactory results in the evaluation of density between the respective areas and in the sensory evaluation by visual observation, as compared with those in Example 1-1.

Examples 2-1 to 2-17

In each of Examples 2-1 to 2-17, ink-jet recording was performed in a similar manner in Example 1-1, except that inks indicated in the following TABLE 3 were used to form the achromatic color recording area, the first achromatic color boundary area, the second achromatic color boundary area and the chromatic color recording area. In the first achromatic color boundary area of each of Examples 2-1 to 2-17, a ratio ($K_a:C_a$) of the usage amount ($K_a$) of the achromatic color ink and the total of the usage amounts ($C_a$) of the three chromatic color inks was indicated as TABLE 3.

With respect to Examples 2-1 to 2-17, evaluation of bleeding was performed by the following methods.

The Rag in the boundary portion between the achromatic color recording area and the chromatic color recording area in each of Examples 2-1 to 2-17 was measured in a similar manner as (a) measurement of Rag in Example 1-1 and Comparative Examples 1-1 to 1-4. In each of Examples 2-1 to 2-17, the value of evaluation of bleeding was calculated by subtracting, from a value of the Rag in a case that the first and second achromatic color boundary areas were not formed (control), a value of the Rag in a case that the first and second achromatic color boundary areas were formed. As the value of evaluation of bleeding is greater (namely, the value of the Rag is smaller than that of the control, and the change amount thereof is greater), it is possible to judge that the bleeding in the boundary portion between the achromatic color recording area and the chromatic color recording area is more suppressed.

The results of measurements and evaluations of Examples 2-1 to 2-17 are indicated in TABLE 3 below.

TABLE 3

|  | Examples | | | | | |
|---|---|---|---|---|---|---|
|  | 2-1 | 2-2 | 2-3 | 2-4 | 2-5 | 2-6 |
| Achromatic color ink "k" used for formation of achromatic color recording area | Bk-1 | Bk-1 | Bk-2 | Bk-3 | Bk-2 | Bk-2 |
| Chromatic color ink "c" used for formation of chromatic color recording area | Y-1 | Y-1 | Y-1 | Y-1 | Y-2 | Y-3 |
| Inks used for formation of first achromatic color boundary area | Bk-1 Y-1 M-1 C-1 | Bk-1 Y-1 M-1 C-1 | Bk-2 Y-1 M-1 C-1 | Bk-3 Y-1 M-1 C-1 | Bk-2 Y-2 M-1 C-1 | Bk-2 Y-3 M-1 C-1 |
| Inks used for formation of second achromatic color boundary area | Y-1 M-1 C-1 | Y-1 M-1 C-1 | Y-1 M-1 C-1 | Y-1 M-1 C-1 | Y-2 M-1 C-1 | Y-3 M-1 C-1 |
| K (surface tension of "k") (mN/m) | 29.6 | 29.6 | 28.5 | 30.9 | 28.5 | 28.5 |
| C (surface tension of "c") (mN/m) | 29.8 | 29.8 | 29.8 | 29.8 | 30.8 | 30.5 |
| $K_a:C_a$ | 25:75 | 61:39 | 25:75 | 25:75 | 70:30 | 40:60 |
| Evaluation of bleeding | 4.9 | 4.0 | 5.5 | 0.7 | 4.1 | 4.3 |

|  | Examples | | | | | |
|---|---|---|---|---|---|---|
|  | 2-7 | 2-8 | 2-9 | 2-10 | 2-11 | 2-12 |
| Achromatic color ink "k" used for formation of achromatic color recording area | Bk-1 | Bk-1 | Bk-1 | Bk-1 | Bk-1 | Bk-4 |
| Chromatic color ink "c" used for formation of chromatic color recording area | Y-4 | M-1 | M-1 | C-1 | C-1 | Y-5 |
| Inks used for formation of first achromatic color boundary area | Bk-1 Y-4 M-1 C-1 | Bk-1 M-1 Y-1 C-1 | Bk-1 M-1 Y-1 C-1 | Bk-1 C-1 Y-1 M-1 | Bk-1 C-1 Y-1 M-1 | Bk-4 Y-5 M-2 C-2 |
| Inks used for formation of second achromatic color boundary area | Y-4 M-1 C-1 | M-1 Y-1 C-1 | M-1 Y-1 C-1 | C-1 Y-1 M-1 | C-1 Y-1 M-1 | Y-5 M-2 C-2 |
| K (surface tension of "k") (mN/m) | 29.6 | 29.6 | 29.6 | 29.6 | 29.6 | 32.8 |
| C (surface tension of "c") (mN/m) | 28.8 | 31.3 | 31.3 | 32.7 | 32.7 | 31.6 |
| $K_a:C_a$ | 61:39 | 25:75 | 61:39 | 25:75 | 61:39 | 54:36 |
| Evaluation of bleeding | 1.2 | 8.8 | 8.6 | 11.1 | 7.2 | 1.1 |

|  | Examples | | | | |
|---|---|---|---|---|---|
|  | 2-13 | 2-14 | 2-15 | 2-16 | 2-17 |
| Achromatic color ink "k" used for formation of achromatic color recording area | Bk-4 | Bk-4 | Bk-4 | Bk-5 | Bk-6 |
| Chromatic color ink "c" used for formation of chromatic color recording area | M-2 | C-2 | Y-1 | Y-1 | Y-1 |
| Inks used for formation of first achromatic color boundary area | Bk-4 M-2 Y-5 C-2 | Bk-4 C-2 Y-5 M-2 | Bk-4 Y-1 M-1 C-1 | Bk-5 Y-1 M-1 C-1 | Bk-6 Y-1 M-1 C-1 |
| Inks used for formation of second achromatic color boundary area | M-2 Y-5 C-2 | C-2 M-2 | Y-1 M-1 C-1 | Y-1 M-1 C-1 | Y-1 M-1 C-1 |
| K (surface tension of "k") (mN/m) | 32.8 | 32.8 | 32.8 | 30.2 | 28.5 |

TABLE 3-continued

| | | | | | |
|---|---|---|---|---|---|
| C (surface tension of "c") (mN/m) | 33.4 | 32.4 | 29.6 | 29.6 | 29.6 |
| $K_a:C_a$ | | 54:36 | 54:36 | 54:36 | 25:75 | 40:60 |
| Evaluation of bleeding | 2.5 | 2.7 | 1.8 | 0.4 | 4.4 |

As indicated in TABLE 3, in each of Examples 2-1 to 2-17, the value of evaluation of bleeding was great, and the bleeding in the boundary portion between the achromatic color recording area and the chromatic color recording area was suppressed. Further, in Example 2-1 satisfying the above-described condition (I) (K<C), the bleeding was prevented more effectively as compared with Example 2-4 in which the ratio $K_a:K_c$ was same as that in Example 2-1. Similarly, in Example 2-2 satisfying the above-described condition (I) (K<C), the bleeding was prevented more effectively as compared with Example 2-7 in which the ratio $K_a:K_c$ was same as that in Example 2-2. Furthermore, in Example 2-1 in which the usage amount of the achromatic color ink was smaller than the total of the usage amounts of the three chromatic color inks in the formation of the first achromatic color boundary area, the bleeding was prevented more effectively as compared with Example 2-2 in which the same inks as those used in Example 2-1 were used for forming the respective areas. Similarly, in Examples 2-8 and 2-10 in each of which the usage amount of the achromatic color ink was smaller than the total of the usage amounts of the three chromatic color inks in the formation of the first achromatic color boundary area, the bleeding was prevented more effectively as compared with Examples 2-9 and 2-11 in which the same inks as those used in Examples 2-8 and 2-10, respectively, were used for forming the respective areas. Moreover, in Example 2-15 which used a pigment ink as the chromatic color ink, the bleeding was prevented more effectively than in Example 2-12 which used the same achromatic color ink as that used in Example 2-15 but used a dye ink as the chromatic color ink.

As described above, according to the present teaching, it is possible to provide an ink-jet recording method and an ink-jet recording apparatus of which the cost is low, in which the recording quality of a recorded matter is excellent, and which is capable of effectively preventing the bleeding in the boundary portion between the achromatic color recording area and the chromatic color recording area. The usage of the ink-jet recording method and the ink-jet recording apparatus related to the present teaching is not particularly limited, and is widely applicable to a variety of kinds of ink-jet recording.

What is claimed is:

1. An ink-jet recording method for performing recording by discharging an ink from an ink-jet head onto a recording medium, the ink constructing an ink set for ink-jet recording which includes an achromatic color ink and at least three chromatic color inks, the method comprising:
formation of an achromatic color recording area in the recording medium by the achromatic color ink;
formation of a chromatic color recording area in the recording medium by at least one chromatic color ink selected from the at least three chromatic color inks; and
formation of a boundary area in the recording medium, the boundary area including a first achromatic color boundary area formed by the achromatic color ink and the at least three chromatic color inks, and a second achromatic color boundary area formed by the at least three chromatic color inks,
wherein the first achromatic color boundary area is located such that the first achromatic color boundary area is adjacent to the achromatic color recording area, and the second achromatic color boundary area is located such that the second achromatic color boundary area is adjacent to the chromatic color recording area; and
the boundary area is formed to have a width, in a direction from the achromatic color recording area toward the chromatic color recording area, of not more than 340 μm, and the second achromatic color boundary area is formed to have a width in the direction of not more than 170 μm.

2. The ink-jet recording method according to claim 1, wherein each of the first achromatic color boundary area and the second achromatic color boundary area is formed to have a width in the direction of not more than 100 μm.

3. The ink-jet recording method according to claim 1, wherein the formation of the first achromatic color boundary area and the formation of the second achromatic color boundary area are performed after performing either one of the formations of the achromatic color recording area and the chromatic color recording area, and before performing the other of the formations of the achromatic color recording area and the chromatic color recording area.

4. The ink-jet recording method according to claim 3, wherein the formations of the achromatic color recording area, the chromatic color recording area, the first achromatic color boundary area and the second achromatic color boundary area, included in a recording area in which recording is performed when the ink-jet head is moved in a scanning direction, are performed while the ink-jet head is performing one scanning in the direction or an opposite direction opposite to the direction.

5. The ink-jet recording method according to claim 1, satisfying the following condition (I):

$$K<C \quad \text{Condition (I):}$$

wherein in the condition (I),
K: surface tension of the achromatic color ink (mN/m); and
C: surface tension of the at least one chromatic color ink selected from the at least three chromatic color inks used for forming the chromatic color recording area (mN/m).

6. The ink-jet recording method according to claim 1, wherein in the formation of the first achromatic color boundary area, an usage amount of the achromatic color ink is smaller than a total of usage amounts of the at least three chromatic color inks.

7. The ink-jet recording method according to claim 1, wherein each of the achromatic color ink and the at least three chromatic color inks contains a pigment.

8. The ink-jet recording method according to claim 1, further comprising color conversion of pixels corresponding to the boundary area into pixels using black, magenta, cyan and yellow and pixels using magenta, cyan and yellow, wherein the pixels corresponding to the boundary area are included in pixel data, of image data for ink-jet recording, including information of color used in pixels corresponding to recording area.

9. The ink-jet recording method according to claim 8, wherein when the color conversion is performed, pixels, among the pixels corresponding to the boundary area, which are adjacent to the achromatic color recording area, are subjected to the color conversion into the pixels using black, magenta, cyan and yellow; and when the color conversion is performed, pixels, among the pixels corresponding to the boundary area, which are adjacent to the chromatic color recording area, are subjected to the color conversion into the pixels using magenta, cyan and yellow.

10. An ink-jet recording apparatus which performs recording by discharging an ink toward a recording medium, the apparatus comprising:
an ink accommodating section configured to be accommodatable an ink set for ink-jet recording which includes an achromatic color ink and at least three chromatic color inks;
an ink jet head; and
a controller configured to control the ink-jet head to perform:
formation of an achromatic color recording area in the recording medium by using the achromatic color ink,
formation of a chromatic color recording area in the recording medium by using at least one chromatic color ink selected from the at least three chromatic color inks, and
formation of a boundary area in the recording medium, the boundary area including a first achromatic color boundary area formed by the achromatic color ink and the at least three chromatic color inks, and a second achromatic color boundary area formed by the at least three chromatic color inks;
the controller controlling the ink-jet head such that the first achromatic color boundary area is located adjacent to the achromatic color recording area and the second achromatic color boundary area is located adjacent to the chromatic color recording area; and that the boundary area is formed to have a width, in a direction from the achromatic color recording area toward the chromatic color recording area, of not more than 340 μm, and the second achromatic color boundary area is formed to have a width in the direction of not more than 170 μm.

11. The ink-jet recording apparatus according to claim 10, wherein the controller controls the ink-jet head such that each of the first achromatic color boundary area and the second achromatic color boundary area is formed to have a width in the direction of not more than 100 μm.

12. The ink-jet recording apparatus according to claim 10, wherein the controller controls the ink-jet head such that the ink-jet head performs the formation of the first achromatic color boundary area and the formation of the second achromatic color boundary area after performing either one of the formations of the achromatic color recording area and the chromatic color recording area, and before performing the other of the formations of the achromatic color recording area and the chromatic color recording area.

13. The ink-jet recording apparatus according to claim 12, wherein the controller controls the ink-jet head such that the ink-jet head performs the formations of the achromatic color recording area, the chromatic color recording area, the first achromatic color boundary area and the second achromatic color boundary area, included in a recording area in which recording is performed when the ink-jet head is moved in a scanning direction, while the ink-jet head is performing one scanning in the direction or an opposite direction opposite to the direction.

14. The ink-jet recording apparatus according to claim 10, satisfying the following condition (I):

$$K<C \quad \text{Condition (I):}$$

wherein in the condition (I),
K: surface tension of the achromatic color ink (mN/m); and
C: surface tension of the at least one chromatic color ink selected from the at least three chromatic color inks used for forming the chromatic color recording area (mN/m).

15. The ink-jet recording apparatus according to claim 10, wherein in the formation of the first achromatic color boundary area, the controller controls the ink-jet head such that an usage amount of the achromatic color ink is smaller than a total of usage amounts of the at least three chromatic color inks.

16. The ink-jet recording apparatus according to claim 10, wherein each of the achromatic color ink and the at least three chromatic color inks contains a pigment.

17. The ink-jet recording apparatus according to claim 10, wherein the controller is configured to perform color conversion of pixels corresponding to the boundary area into pixels using black, magenta, cyan and yellow and into pixels using magenta, cyan and yellow, wherein the pixels corresponding to the boundary area are included in pixel data, of image data for ink-jet recording, including information of color used in pixels corresponding to recording area.

18. The ink-jet recording apparatus according to claim 17, wherein when performing the color conversion, the controller performs color conversion of pixels, among the pixels included in the pixel data used for the recording and constructing the boundary area, which are adjacent to the achromatic color recording area, into the pixels using black, magenta, cyan and yellow; and
when performing the color conversion, the controller performs color conversion of pixels, among the pixels included in the pixel data used for the recording and constructing the boundary area, which are adjacent to the chromatic color recording area, into the pixels using magenta, cyan and yellow.

* * * * *